Nov. 12, 1946.　　　　L. DE FOREST　　　　2,410,868
MEANS AND METHOD FOR ALTITUDE DETERMINATION
Filed Aug. 23, 1941
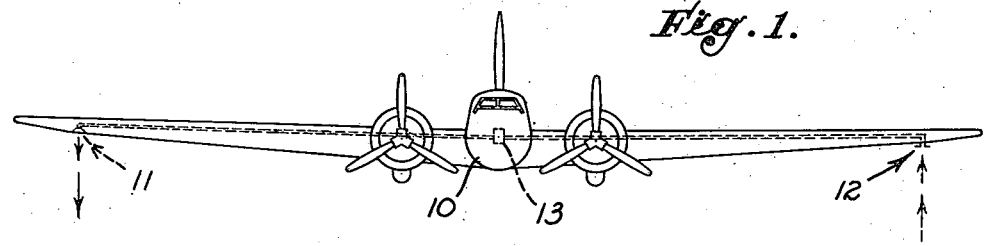
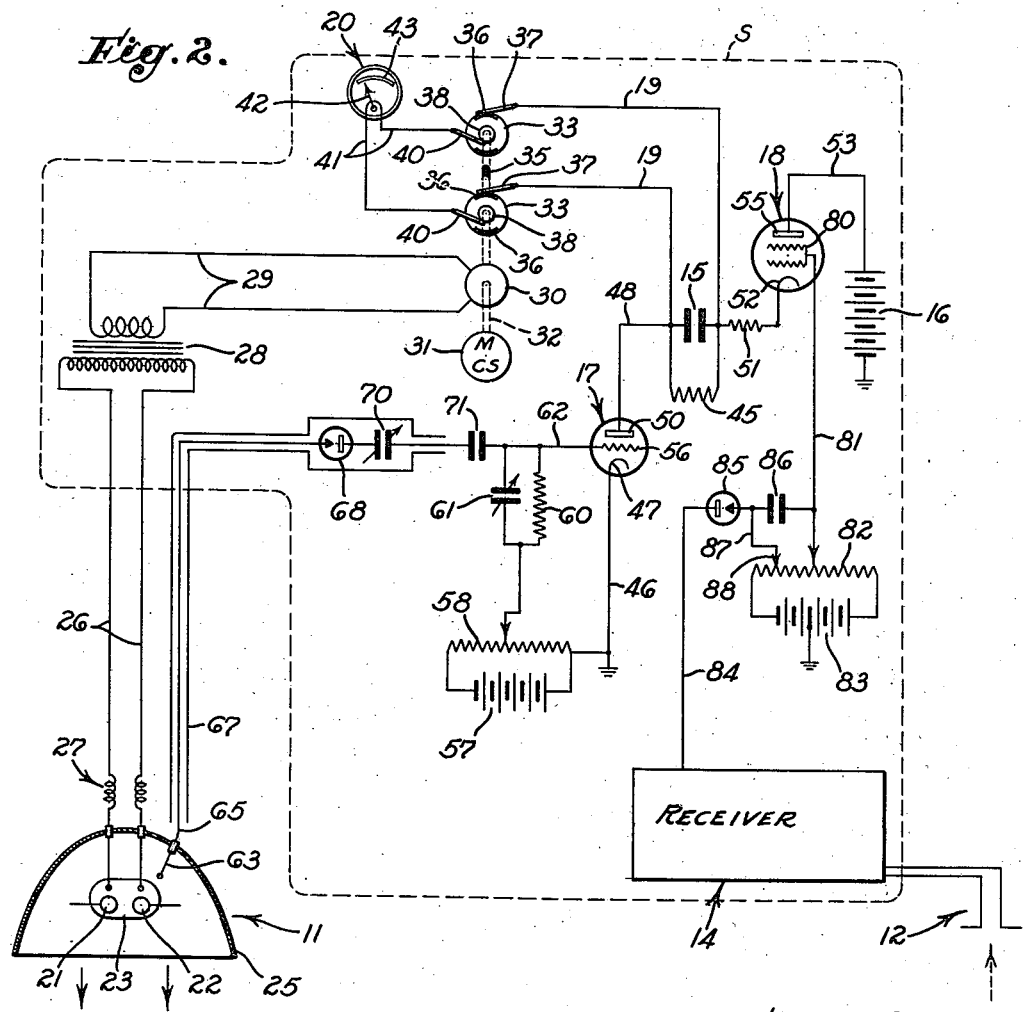
INVENTOR
LEE DE FOREST
BY
HARRIS, KIECH, FOSTER & HARRIS
FOR THE FIRM
ATTORNEYS.

Patented Nov. 12, 1946

2,410,868

UNITED STATES PATENT OFFICE 2,410,868

MEANS AND METHOD FOR ALTITUDE DETERMINATION

Lee de Forest, Los Angeles, Calif.

Application August 23, 1941, Serial No. 408,114

17 Claims. (Cl. 250—1.66)

1

The present invention relates broadly to a method of measuring time and is specifically adapted to determining distances from an airplane based on the elapsed time between the transmission of an electromagnetic signal from the airplane and the detection on the airplane of the resultant reflected signal.

The general object of the invention is to provide an efficient and reliable system for measuring time. A further object is to provide an accurate system for determining the distance of an aircraft from terrain below the aircraft or from any surface that may reflect the electromagnetic signal. One of the special objects of the invention is to provide such a system that will measure especially short distances in an instantaneous manner.

My invention is based on the concept of accumulating an electric charge on a condenser over a period of elapsed time to be measured and then evaluating such accumulation. A system to carry out this concept in measuring distance will include a condenser, a circuit for charging the condenser, means responsive to a signal transmitter and responsive to a signal detector to control the charging circuit, and means to measure the condenser charge. It is obvious that under this concept my system may take various forms. For the purpose of this disclosure I elect to describe an embodiment in which the condenser-charging circuit is switched on and off by vacuum-tube means and in which the accumulated charge on the condenser is evaluated when the condenser is discharged, the measurement being in terms of distance.

One object of the preferred form of the invention is to provide an operating cycle of exceedingly short duration. A further object is to provide means for automatically repeating the cycle at a rapid rate to produce closely successive distance values to keep abreast of exceedingly rapid changes in space relationships.

Other objects and advantages of the invention will be apparent in the detailed description to follow, taken with the accompanying drawing.

In the drawing which is to be considered as illustrative only

Fig. 1 is a front elevational view of an airplane equipped with my invention; and Fig. 2 is a wiring diagram of the system.

Fig. 1 shows an airplane 10 equipped with my distance-measuring apparatus, the apparatus including a signal transmitter generally designated 11 on one wing, a dipolar antenna generally designated 12 on the other wing, and a housing or

2 indicator station 13. Signals radiated from the transmitter 11 strike a surface that is the subject of measurement, for example, the surface of the terrain below the aircraft, and are reflected back to the antenna 12 with a lapse of time determined by the distance. The transmitter may be adjustable to point in various directions desired by the operator.

Fig. 2 shows diagrammatically basic elements of the system enclosed by a shield S, the basic elements including: the transmitter 11; a receiver generally designated 14 connected with the antenna 12; a condenser 15; a circuit represented by a constant voltage battery 16 for charging the condenser; a vacuum tube 17 for controlling the charging circuit in response to signals generated by the transmitter 11; a vacuum tube 18 to control the discharge circuit in response to reflected signals detected by the receiver 14; a circuit represented by wires 19 for discharging the condenser 15; and an indicating means 20 in the discharge circuit.

The transmitter 11 may be of any suitable type, capable of radiating exceedingly short signals of a character to be effectively reflected back to the airplane. Such a transformer may, for example, employ a quench spark gap in the midsection of an ultra high frequency oscillating and radiating circuit.

Fig. 2 indicates such a spark gap represented by two electrodes 21 and 22 in a glass envelope 23 containing a gas such as hydrogen or nitrogen under pressure, the space between the electrodes being at or near the focal point of a parabolic reflector 25. The spark gap is connected by a pair of leads 26 with a suitable source of current such as the secondary coil of a step-up transformer 28. Preferably the two leads 26 include a pair of radio frequency choke coils 27. The transformer 27, which may be of the open core type, has its primary side connected by a pair of wires 29 to a suitable source, such as a magneto 30.

A feature of the preferred form of my invention is the employment of a prime mover for the magneto 30 in a manner to correlate various elements of the system and in a manner to effectively govern the cyclic operation of the system as a whole. Such a prime mover serving as a cyclic operating means may be a battery-driven constant-speed motor 31 having a drive shaft 32 which not only actuates the magneto 30 to generate signals at predetermined intervals, but also for the purpose of correlation actuates certain circuit controlling means to be described.

The drawing shows a pair of commutators 33 that are associated with the wires 19 and function to periodically close the circuit for discharging the condenser 15. To insulate the two commutators from each other, the shaft 32 may include a non-conducting portion 35. Each commutator has at least one and preferably two peripheral insulating segments 36 and rotates in peripheral contact with a brush 37 connected to one of the two wires 19. Each commutator 33 also has a slip ring 38 in contact with a brush 40, the two brushes 40 being connected to wires 41 to complete the discharge circuit through the indicating means 20. The indicating means 20, which may be any suitable current-responsive or potential-responsive means, has a hand or pointer 42 that moves along a scale 43 calibrated in units of distance. The condenser 15 may be shunted by a high resistance "bleeder" 45 to permit slow drainage across the condenser when the discharge circuit is left open for any considerable period of time.

The charging circuit for the condenser may be constituted as follows: a grounded wire 46 to the cathode 47 of the vacuum tube 17; a wire 48 from the plate 50 of the vacuum tube 17 to one side of the condenser 15; a resistance 51 from the other side of the condenser to the cathode 52 of the vacuum tube 18; and a wire 53 from the plate 55 of the vacuum tube 18 to the positive terminal of the battery 16, the negative terminal of the battery being grounded. The vacuum tube 17 is functionally the equivalent of a normally open switch that closes in response to generation of a signal by the transmitter 11, and the vacuum tube 18 is likewise functionally equivalent to a normally closed switch that opens in response to the detection of a reflected signal by the receiver 14.

To give the grid 56 of the vacuum tube 17 a normal negative bias to hold the vacuum tube in normal non-conducting state, I provide a "C" battery 57 with a potentiometer 58 for voltage regulation. The movable contact of the potentiometer 58 is connected with the grid 56 through a resistance 60 and a variable condenser 61, the resistance and variable condenser being in parallel and both being connected to the grid 56 by a wire 62. To reverse the potential of the grid 56 in response to the generation of a signal I prefer to use a short pick-up antenna 63 near the spark gap of the transmitter 11 and to operatively connect the pick-up antenna with the grid 56 in some suitable manner. In the particular arrangement illustrated, a pick-up line 65 in a shield 67 connects the antenna 63 with a rectifier 68 designed to pass positive impulses. The rectifier is in series with a variable condenser 70 and a fixed condenser 71, the latter condenser being connected to the previously mentioned wire 62 that leads to the grid 56.

To insure a normal positive bias for the grid 80 to maintain the vacuum tube 18 in conductive state, the grid is connected by a wire 81 to a suitably adjusted potentiometer 82 that shunts a "C" battery 83, the battery being centrally grounded. It is contemplated that the grid 80 will be operatively connected with the receiver 14 to cause the potential of the grid to be reversed to negative automatically whenever a reflected signal is detected. The high frequency receiver 14, which detects and suitably amplifies the reflected signal, has an output lead 84 to a rectifier 85 designed to pass negative impulses, and the rectifier 85 is in turn connected through a condenser 86 and the wire 81 to the grid 80 of the vacuum tube 18. For discharge across the condenser 86 at adjustably retarded rate, a wire 87 connected between the condenser 86 and the rectifier 85 leads to a movable contact 88 of the potentiometer.

The operation of the system may be readily understood from the foregoing description. Normally, the grid 56 of the vacuum tube 17 has a negative bias to make the vacuum tube non-conducting, while the grid 80 of the vacuum tube 18 has a normal positive bias to permit current flow. When a signal is radiated by the transmitter 11, the pick-up system including the pick-up antenna 63 changes the potential of the grid 56 to a positive bias, thereby closing the condenser circuit to permit the battery 16 to cumulatively charge the condenser 15. When the radiated signal is reflected back to the antenna 12, the receiver 14 acting through the condenser 86 changes the potential of the grid 80 from positive to negative and thereby stops flow through the charging circuit. Finally, the commutators 33 close the circuit through the indicating device 20 to cause the condenser 15 to be discharged, whereupon the hand 42 registers on the scale 43 the distance to the surface from which the signal wave was reflected.

The maximum charge capacity of the condenser, together with the associated capacity of the wires 19, is taken into account and the value of the resistance 51 in the charging circuit is selected to keep the charging rate relatively low so that the condenser cannot be charged to capacity within the charging period permitted by the system.

The described sequence of operations constitutes an operating cycle that is initiated by the radiation of a signal from the transmitter 11 and is terminated by the closing of the discharge circuit by the commutators 33. In the present arrangement one revolution of the motor drive shaft 32 causes two cycles of operation, the magneto 30 generating two spaced signals and the commutators 33 closing the discharge circuit twice at spaced intervals.

The variable condenser 61 is adjusted to cooperate with the resistance 60 to maintain the grid 56 of the vacuum tube 17 at a positive bias after a signal is radiated and until near the end of the operating cycle, thereby to permit current to flow through the charging circuit until a reflected signal is received. On the other hand, it is contemplated that the contact 88 of the potentiometer 82 will be so adjusted that the grid 80 of the vacuum tube 18 will maintain its abnormal negative bias for a sufficient interval after the reflected signal is received to avoid closing the charging circuit a second time in the operating cycle. In other words, the system is to be adjusted to avoid overlapping of the conducting states of the two vacuum tubes 17 and 18 in an operating cycle after a reflected signal is received. Such overlap, if encountered, may be eliminated, for example, by making the recovery lag of vacuum tube 18 slightly longer than the recovery lag of vacuum tube 17 and making the operating cycle longer than the total of both the recovery lags.

It is requisite that the radiated signal be exceedingly brief to be terminated before the reflected signal reaches the receiving antenna, hence the employment of a strongly damped spark impulse created by a single strong voltage impulse. If the spark is quenched at the end of the third or fourth oscillation and the wave length of the electromagnetic radiation is of the order of two meters, the duration of signal radiation will correspond to a total signal travel of less than ten meters. In such event the radiated signal will not overlap the detected signal unless the reflecting surface is less distant than five or six meters from the airplane. At this minimum distance the interval between the pick-up by the antenna 63 and the pick-up by the receiver 12 will be of the order of $1/50$ micro-second.

The duration of the charging of the condenser 15 will include the interval between energizations of the antenna 63 and the receiver 12, plus the time required for current to travel through the system, plus inherent lag in the functioning of various elements and circuits in the system. These latter two time factors of current travel and operation lag are constant and may be readily compensated in calibrating the indicating instrument 20. Since a time interval of as short as $1/100$ of a second between the radiation of a signal and the closing of the discharge circuit is adequate to measure any range of distances that may be desired in practice, it is apparent that the distance determinations may be made continually in exceedingly close succession to reflect accurately rapidly changing spatial relationships. The rate of operation is sufficient to cope with the rapid changes involved in measuring the distance from one high speed airplane to another.

The possibility of using one vacuum tube instead of two vacuum tubes in the charging circuit may be mentioned. This possibility arises from the fact that the sending of the signal has a constant time relation to the beginning of the operating cycle, and therefore the closing of the charging circuit may be accomplished by the cyclic operating means in some constant time relation to the beginning of the operating cycle.

Another possibility is that of restoring the normal grid bias of each vacuum tube by some means mechanically related to the cyclic operating means, for example, by using commutator means for establishing drainage circuits relative to the vacuum tube grids.

The particular cyclic operating means employed herein is rotary but in various practices of the invention may be non-rotary. Thus a vibrator of the type commonly employed in police car transmitters may be utilized as the cyclic operating means. The vibrator would interrupt a transformer primary circuit to generate the required signal and would also operate to open and close the circuit for periodically discharging the condenser.

My description in detail of the preferred form of the invention for the purpose of disclosure and to illustrate the principles involved will suggest various changes and modifications under my concept, and I reserve the right to all such departures from the disclosure that properly come within the scope of my appended claims.

I claim as my invention:

1. An apparatus for measuring a short time interval, including: a condenser; a circuit for charging the condenser at a predetermined rate; a first vacuum tube in said circuit normally in non-conducting state; a second vacuum tube in said circuit normally in conducting state, said vacuum tubes being in series so that both tubes must be in conducting state simultaneously for current flow through said circuit; means to change said first vacuum tube to conducting state at approximately the beginning of said interval; means to change said second vacuum tube to non-conducting state at approximately the end of said interval; and means to evaluate the accumulated charge on the condenser.

2. An apparatus for measuring a short time interval, including: a condenser; a circuit for charging the condenser at a predetermined rate; a first vacuum tube in said circuit having a grid normally biased to cut off flow through the circuit; a second vacuum tube in said circuit in series with said first vacuum tube, said second vacuum tube having a grid normally biased to permit flow through the circuit; means to change the bias of said first grid upon initiation of said time interval; means to change the bias of said second grid upon termination of the interval; and indicating means responsive to the condenser charge.

3. An apparatus for measuring a short time interval, including: a condenser; a circuit for charging the condenser at a predetermined rate; a first vacuum tube in said circuit having a grid normally biased to cut off flow through the circuit; a second vacuum tube in said circuit in series with said first vacuum tube, said second vacuum tube having a grid normally biased to permit flow through the circuit; automatic means to deliver an electrical impulse to change the bias of said first grid upon initiation of said time interval; automatic means to deliver an electrical impulse to change the bias of said second grid upon termination of said interval; and means to evaluate the accumulated condenser charge.

4. In a system for measuring a short interval of time, the combination of: a circuit; two vacuum tubes in series in said circuit, the cathode of one vacuum tube being connected to the anode of the other; two grids controlling circuit flow through said vacuum tubes respectively, one of said grids being normally biased positively and the other being normally biased negatively; means to change the bias of one of said tubes at the beginning of the time interval and to change the bias of the other at the end of the time interval; and means to evaluate a cumulative effect of current flow through said circuit.

5. An apparatus for determining the distance from a station to a remote surface, including: a condenser at said station; a circuit for charging the condenser at a predetermined rate; a first vacuum tube in said circuit having a grid normally biased to cut off flow through the circuit; a second vacuum tube in said circuit in series with said first vacuum tube, said second vacuum tube having a grid normally biased to permit flow through the circuit; means to radiate a signal from said station toward said surface of a character to be reflected by the surface back to said station; means effective to change the bias of said first grid when said signal is radiated; means to change the bias of said second grid in response to the reflected signal; and means to evaluate the condenser charge.

6. An apparatus for determining the distance from a station to a remote surface, including: means to radiate a signal from said station to said surface of a character to be reflected back to the station by the surface; an operating means at said station adapted to operate in successive cycles, said operating means being complete apart from said signal means and being operatively connected with said signal means to generate signals early in each of said successive cycles; a circuit at said station normally closing during an initial portion of each operating cycle; a condenser in said circuit; means at said station to open said circuit in response to the reflected signals; means controlled by said operating means to discharge said condenser near the end of each operating cycle; and means to evaluate the condenser charge accumulated during each cycle.

7. An apparatus for determining the distance from a station to a remote surface, including: means to radiate a signal from said station to said surface of a character to be reflected back to the station by the surface; an operating means at said station adapted to operate in successive cycles, said operating means being complete apart from said signal means and being operatively connected with said signal means to generate signals early in each of said successive cycles; a circuit at said station normally closed during an initial portion of each operating cycle; means at said station to open said circuit in response to the reflected signals; means to accumulate an effect in response to a period of continuous current flow through said circuit; and means to evaluate said accumulated effect.

8. An apparatus for measuring the distance to a surface, including: means to transmit toward said surface a strongly damped electromagnetic wave train of the order of ten cycles or less for reflection back from the surface; a condenser; a normally open circuit for charging said condenser; means to close said circuit when said wave train is transmitted; a receiver operatively connected with said circuit to open the circuit when the reflection of said wave train is received; and means to evaluate the resulting charge on said condenser.

9. An apparatus for measuring the distance to a surface, including: a spark-gap transmitter for radiating toward said surface a steep front electromagnetic impulse; a condenser; a normally open circuit for charging said condenser; means effective to close said circuit when said impulse is transmitted; a receiver to receive the reflection of said impulse; means responsive to said receiver to open said circuit when said reflection is received; and means to evaluate the resulting charge on said condenser.

10. An apparatus for measuring the distance to a surface, including: means to transmit toward said surface an aperiodic damped electromagnetic impulse; a condenser; a vacuum tube having a plate circuit for charging said condenser, said tube being normally biased for current flow through said circuit; means normally holding said circuit open; means operatively connected with said holding means to close said circuit when said impulse is transmitted; a receiver to receive the reflection of said impulse; means responsive to said receiver to change the bias of said tube when said reflection is received, thereby to open said circuit; and means to evaluate the resulting condenser charge.

11. An apparatus for measuring the distance to a surface, including: means adapted to operate repeatedly through a predetermined cycle; means responsive to said operating means to transmit an electromagnetic impulse toward said surface at a predetermined early point in said cycle; a condenser; a vacuum tube having a plate circuit for charging said condenser, said tube being normally biased for current flow through said circuit; means normally holding said circuit open; means operatively connected with said holding means to close said circuit at said predetermined early point in said cycle; a receiver to receive the reflection of said impulse; means responsive to said receiver to change the bias of said tube when said reflection is received, thereby to open said circuit; means responsive to said operating means at a later point in said cycle to discharge said condenser; and means to evaluate the charge on said condenser.

12. An apparatus for measuring the distance to a surface, including: means adapted to operate repeatedly through a predetermined cycle; means responsive to said operating means to transmit an electromagnetic impulse toward said surface at a predetermined early point in said cycle; a receiver to receive the reflection of said impulse; a condenser; a circuit for charging said condenser; a first vacuum tube in said circuit normally biased in non-conducting state, said tube being responsive to said transmitting means to change bias when said impulse is transmitted; a second vacuum tube in said circuit normally biased in conducting state, said second tube being responsive to said receiver to change bias when the reflection of said impulse is received; means responsive to said operating means at a later point in said cycle to discharge said condenser; and means to evaluate the charge on said condenser.

13. An apparatus for measuring the distance to a surface, including: means adapted to operate repeatedly through a predetermined cycle; means responsive to said operating means to transmit an electromagnetic impulse toward said surface at a predetermined early point in said cycle; a first receiver to receive said impulse directly; a second receiver to receive the reflection of said impulse; a condenser; a circuit for charging said condenser; a first vacuum tube in said circuit normally biased in non-conducting state, said tube being responsive to said first receiver to change bias when said impulse is transmitted; a second vacuum tube in said circuit normally biased in conducting state, said second tube being responsive to said second receiver to change bias when the reflection of said impulse is received; means to discharge said condenser at a later point in said cycle; and means to evaluate the charge on said condenser.

14. A method of determining distance characterized by the use of a condenser, including the steps of: transmitting toward a surface the distance of which is to be measured, a steep front electromagnetic wave train consisting of only a few ultra-high-frequency cycles for reflection back from the surface; initiating flow of current at a predetermined rate to charge said condenser in response to transmission of said wave train; terminating said flow of charging current in response to receipt of the reflection of said wave train; and measuring the resulting condenser charge in terms of said distance.

15. A method of determining distance characterized by the use of a spark-gap transmitter and a condenser, which method includes the steps of: transmitting toward a surface, the distance of which is to be measured, a steep front electromagnetic impulse for reflection back from the surface; initiating flow of current at a predetermined rate to charge said condenser in response to transmission of said impulse; terminating said flow of charging current in response to receipt of the reflection of said impulse; and measuring the resulting condenser charge in terms of said distance.

16. A method of determining a relatively short distance characterized by the use of two vacuum tubes in series in a timing circuit, said method including the steps of: biasing one of said vacuum tubes normally to non-conducting state and the other tube normally to conducting state, thereby normally holding said timing circuit open; transmitting toward a surface, the distance of which is to be measured, an aperiodic damped electromagnetic impulse for reflection back from the surface; substantially simultaneously biasing said one vacuum tube to conducting state, thereby closing said timing circuit; biasing said other vacuum tube to non-conducting state in response to receipt of the reflection of said impulse, thereby opening said timing circuit; and evaluating the current flow in said timing circuit in terms of distance.

17. An apparatus for measuring the distance to a surface, including: means to transmit toward said surface a steep front electromagnetic wave train consisting of only a few ultra-high-frequency cycles for reflection back from the surface; a condenser; a normally open circuit for charging said condenser; means for closing said circuit simultaneously with the initiation of said wave train; a receiver operatively connected with said circuit to open the circuit when the reflection of said wave train is received; and means to evaluate the resulting charge of said condenser.

LEE DE FOREST.